Figure 4:
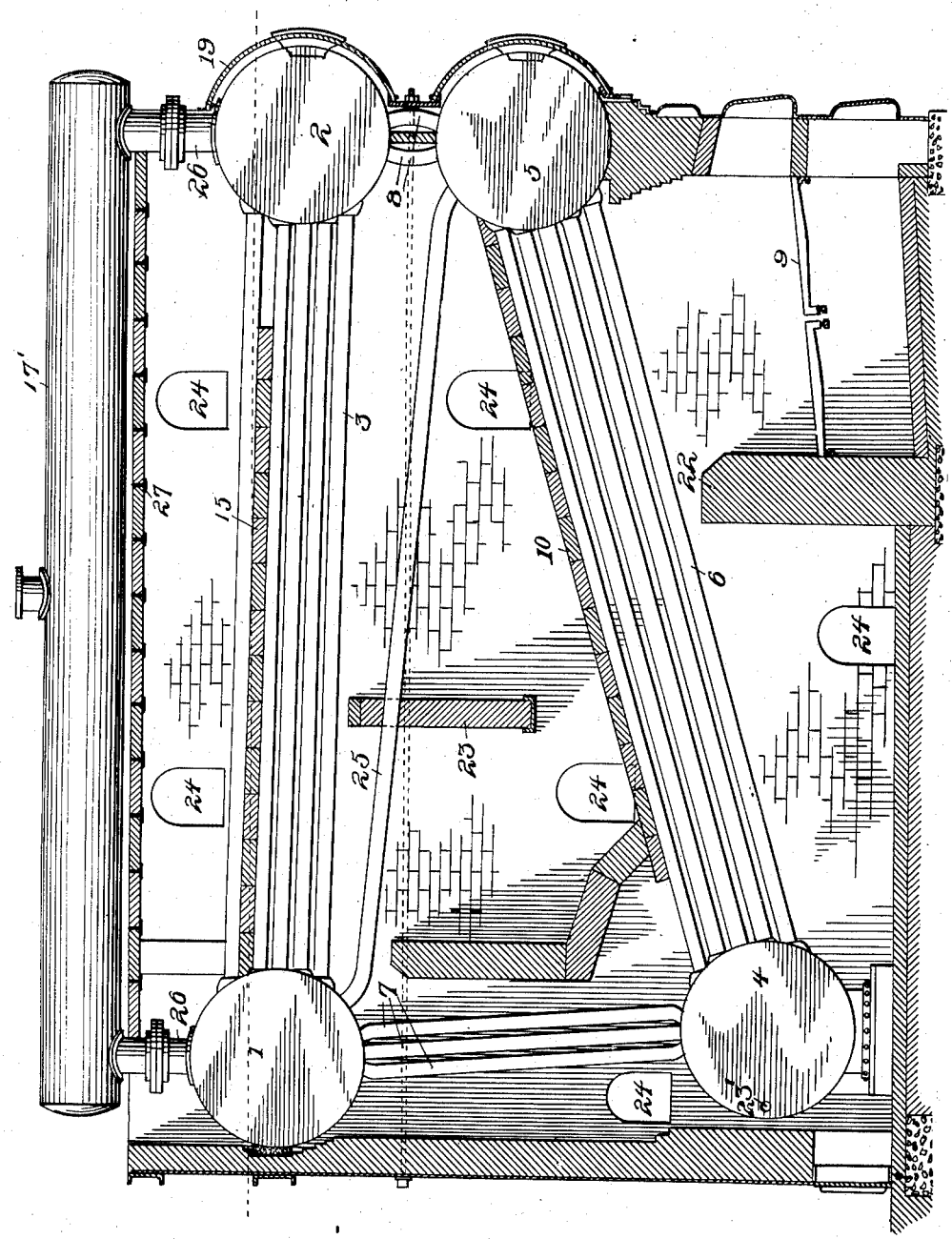

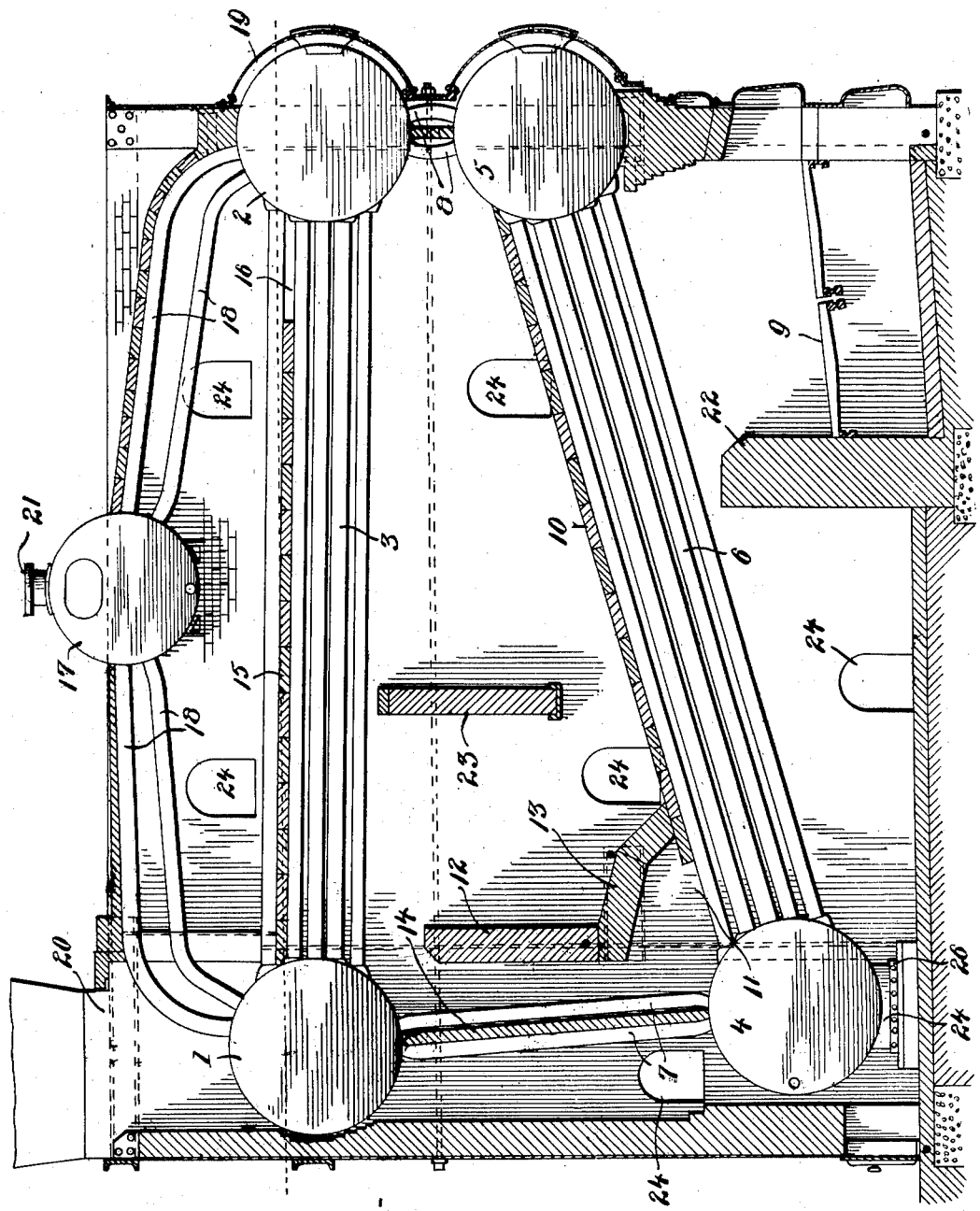

No. 868,891. PATENTED OCT. 22, 1907.
E. G. RUST.
WATER TUBE BOILER.
APPLICATION FILED FEB. 26, 1906.

3 SHEETS—SHEET 2.

WITNESSES:

INVENTOR
Edwin G. Rust,
By Pierce & Barber
Attorneys

No. 868,891. PATENTED OCT. 22, 1907.
E. G. RUST.
WATER TUBE BOILER.
APPLICATION FILED FEB. 26, 1906.
3 SHEETS—SHEET 3.
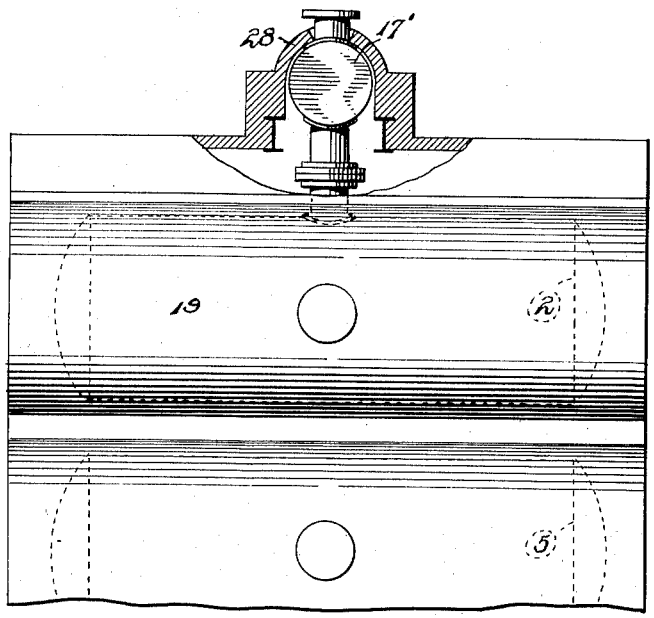
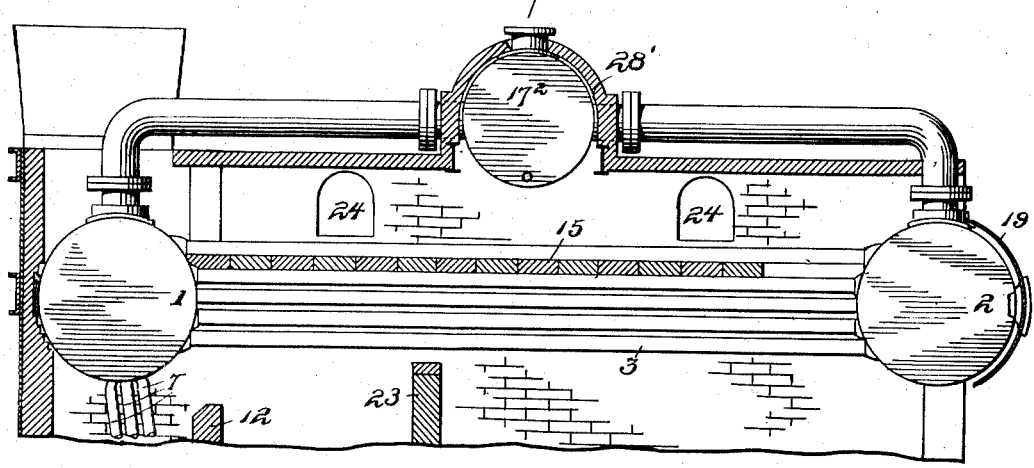
WITNESSES:
INVENTOR
Edwin G. Rust,
BY Pierce & Barber
Attorneys

UNITED STATES PATENT OFFICE.

EDWIN G. RUST, OF ELK RAPIDS, MICHIGAN.

WATER-TUBE BOILER.

No. 868,891.  Specification of Letters Patent.  Patented Oct. 22, 1907.

Application filed February 26, 1906. Serial No. 302,855.

*To all whom it may concern:*

Be it known that I, EDWIN G. RUST, a citizen of the United States, residing at Elk Rapids, in the county of Antrim and State of Michigan, have invented or discovered new and useful Improvements in Horizontal Water-Tube Boilers, of which the following is a specification.

My invention relates to water-tube boilers and its object is to provide a boiler of the horizontal type with low head-room and preferably straight tubes.

It is also an object of my invention to arrange the parts thereof so as to give a very desirable circulation of water and an economical circulation of gases.

In addition to the above, I preferably provide my boiler with an efficient superheater.

Referring to the drawings which accompany this specification and form a part hereof, Figure 1 is a section from front to rear of one form of a boiler construction in accordance with my invention; Fig. 2, a similar view of a second form of a boiler involving my invention; Fig. 3, a front elevation of the upper portion of a boiler, a portion being broken away to show a second form of my invention, wherein the steam drum or super-heater drum is arranged transversely of the remaining drums; and Fig. 4, a view similar to Fig. 1, but with the super-heater connected to the upper steam and water drums by pipes above the setting.

On the drawings 1 and 2 designate a pair of horizontal steam and water drums connected together by an approximately horizontal bank of straight tubes 3, preferably five in number.

Below the drums 1 and 2 are a pair of horizontal drums 4 and 5 connected together by an inclined bank of preferably five straight tubes 6.

The drums 1 and 4 are connected by the water circulators 7, while the drums 2 and 5 are connected by the water circulators 8, the latter being preferably shorter than the circulators 7. The grate 9 is placed preferably below the higher end of the bank 6.

A baffle-tiling 10 is placed above the upper row of the bank 6, a space 11 being left between the tiling and the drum 4 for the escape of the gases. From the passage 11 the gases pass up the baffle-wall 12 and the arch 13 on one side and the baffle-tiling 14 on the other, the latter being preferably placed between the rows of circulators 7; but the tiling may be placed differently, or even omitted, if desired. By placing it as shown, the circulation would probably be more positively directed, as the rear tubes will in that case be in a distinctly cooler place than the front ones.

Between the two upper rows of tubes of the bank 3 I place the baffle-tiling 15, between which and the drum 2 is the passage 16 for the gases.

Above the bank of tubes 3 is the drum 17, which is connected to the drums 1 and 2 by the curved tubes 18.

This drum and the tubes 18 contain steam only, as they are above the water-line 19; and they are in the path of the gases as they pass from the passage 16 to the stack connection 20. The drum 17 may be placed further forward or rearward, or even over either of the drums 1 or 2, if preferred. The water-line is shown approximately at the center of the upper row of tubes 3 and the drum 1 is shown slightly higher than the drum 2 to permit the water to pass more readily from the former to the latter, but these drums may be placed at the same level, or the drum 1 may be at a lower level than the drum 2, if desired.

The steam outlet is indicated at 21 at the top of the drum 17. The gases flow over the bridge wall 22 and down among the tubes 6, up through the passage 11, between the baffle walls 12 and 14 and forward among the four lower rows of tubes 3, the baffle wall 23 assisting to confine the gases to the space occupied by these tubes. The gases pass up through the passage 16 and then rearwardly among the tubes 18 and against steam drum 17, and finally through the connection 20 into the stack. The main water circulation is opposite the travel of the gases. The feed-water preferably enters the drum 4 as shown at 23′ on Fig. 2.

The boiler is provided with the small cleaning doors 24, in the side of the setting to give access to the larger spaces in the boiler for the purpose of inspection, cleaning, and repairing. The drum 5 is supported rigidly on the setting while the drum 4 is supported on the saddle 24 mounted on the rollers 26′.

The drums 1, 2, 4, and 5 are cylinders provided with individual bosses for the tubes 3 and 6, the bosses not materially affecting the circular form of the cross-section of the drums, as the space between the bosses conforms to the general contour of the drums.

Referring now to Fig. 2, the construction is the same as on Fig. 1 except that the baffle-wall 14 and the steam superheater have been omitted; the number of rows of the tubes 7 have been increased to three rows, but the number may be more or less than three, as desired; the drums 1 and 5 have been connected by the row of tubes 25, but there may be more than one row of these tubes, if desired and they may connect the drums differently than shown.

In place of the steam superheater of Fig. 1, I have placed a steam drum 17′ longitudinally of the setting above the drums 1 and 2, to which the drum 17′ is connected by the steam connectors 26. The drum 17′ is separated from the path of the gases by the baffle 27.

Fig. 3 does not differ materially from Fig. 2, except that the drum 17′ is placed in the arch 28 in the roof of the setting, the under portion of the drum 17′ being exposed to the heat of the furnace gases as they pass above the baffle 15.

In Fig. 4 the steam drum $17^2$ is shown in an arch 28′ which runs at a right angle to the arch shown on Fig. 3. The steam tubes 29 extend from the drums 1 and 2 over the roof of the setting to the steam drum 17².

I claim—

1. In a water-tube boiler, a pair of front horizontal drums at different levels, water-circulators connecting the same, a pair of rear horizontal drums at different levels, water-circulators connecting the same, a bank of tubes connecting the upper drums, a bank of tubes connecting the lower drums, and a baffle arranged to direct the gases from the front of the boiler rearwardly along the lower bank of tubes, a baffle arranged to direct the gases from the rear end of the boiler upwardly among the rear set of water circulators, means preventing the gases passing thence rearwardly around the rear upper drum, a baffle arranged to direct the gases forwardly from the rear of the boiler along the upper bank of tubes.

2. In a water-tube boiler, a pair of front horizontal drums at different levels, water-circulators connecting the same, a pair of rear horizontal drums at different levels, water circulators connecting the same, a bank of tubes connecting the upper drums, the rear upper drum being at a higher level than the front upper drum, a bank of tubes connecting the lower drums, and a baffle arranged to direct the gases from the front of the boiler rearwardly along the lower bank of tubes, a baffle arranged to direct the gases from the rear end of the boiler upwardly among the rear set of water circulators, means preventing the gases passing thence rearwardly around the rear upper drum, a baffle arranged to direct the gases forwardly from the rear of the boiler along the upper bank of tubes.

3. In a water-tube boiler, a pair of front horizontal steam and water drums at different levels, water-circulators connecting the same, a pair of rear horizontal drums at different levels, water circulators connecting the same, a bank of tubes connecting the upper drums, a bank of tubes connecting the lower drums, the rear lower drum being at a lower level than the front lower drum, and a baffle arranged to direct the gases from the front of the boiler rearwardly along the lower bank of tubes, a baffle arranged to direct the gases from the rear end of the boiler upwardly among the rear set of water circulators, means preventing the gases passing thence rearwardly around the rear upper drum, a baffle arranged to direct the gases forwardly from the rear of the boiler along the upper bank of tubes.

4. In a water-tube boiler, a pair of front horizontal steam and water drums at different levels, water circulators connecting the same, a pair of rear horizontal drums at different levels, water circulators connecting the same, a bank of tubes connecting the upper drums, the rear upper drum being at a higher level than the front upper drum, a bank of tubes connecting the lower drums, the rear lower drum being at a lower level than the front lower drum, and a baffle arranged to direct the gases from the front of the boiler rearwardly along the lower bank of tubes, a baffle arranged to direct the gases from the rear end of the boiler upwardly among the rear set of water circulators, means preventing the gases passing thence rearwardly around the rear upper drum, a baffle arranged to direct the gases forwardly from the rear of the boiler along the upper bank of tubes.

5. In a water-tube boiler of the horizontal type, front and rear upper drums and front and rear lower drums, water circulators connecting the front drums, circulators connecting the rear drums, a bank of tubes connecting the upper drums, a bank of tubes connecting the lower drums, baffles arranged to cause the gases to traverse serially the lower and upper banks of tubes, a baffle arranged between the rows of rear water-circulators, a baffle arranged to cause the gases to pass from the lower bank of tubes along the water-circulators on one side of the said baffle between the circulators.

6. In a water-tube boiler, a pair of front and rear lower drums, the front being at a higher elevation than the rear drum, a bank of inclined tubes connecting said drums, a fire-box beneath the higher ends of said tubes, a baffle to direct the gases downwardly among said tubes, a pair of front and rear upper drums, a bank of tubes connecting the same, water circulators connecting the front drums, water-circulators connecting the rear drums, and baffling arranged to direct the gases along the rear water-circulators and forwardly among the tubes of the upper bank.

7. In a water-tube boiler, three horizontal gas-passes, a pair of drums and connecting water-tubes in each of the two lower passes, water-circulators connecting each upper with a lower drum, and a steam collector and superheater in the upper pass, connected with the drums of the middle pass.

8. In a water-tube boiler, two horizontal gas-passes, a pair of drums, and connecting tubes in each pass, water-circulators between each upper drum and lower drum, baffling arranged to direct the gases upwardly along one bank of water-circulators, and a bridge in the upper pass in front of the said baffling to direct and confine the gases therein so as to cause them to travel among the tubes in said pass.

Signed at Pittsburg, Pa., this 17th day of February, 1906.

EDWIN G. RUST.

Witnesses:
F. N. BARBER,
C. E. EGGERS.